Feb. 6, 1940.  W. C. ANTHONY  2,189,052
PICKUP AND DUMPING VEHICLE
Filed Nov. 30, 1938  4 Sheets-Sheet 1
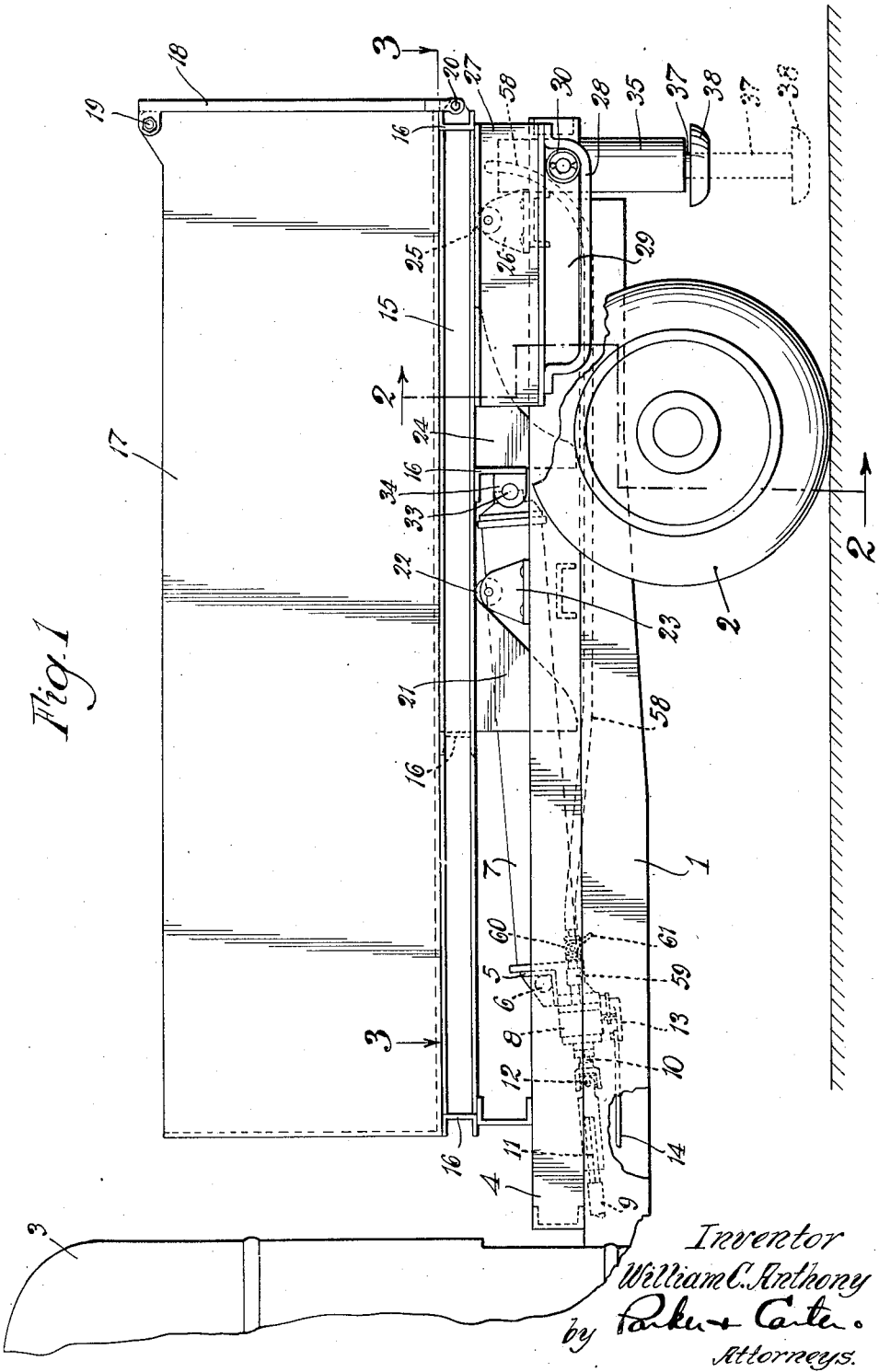

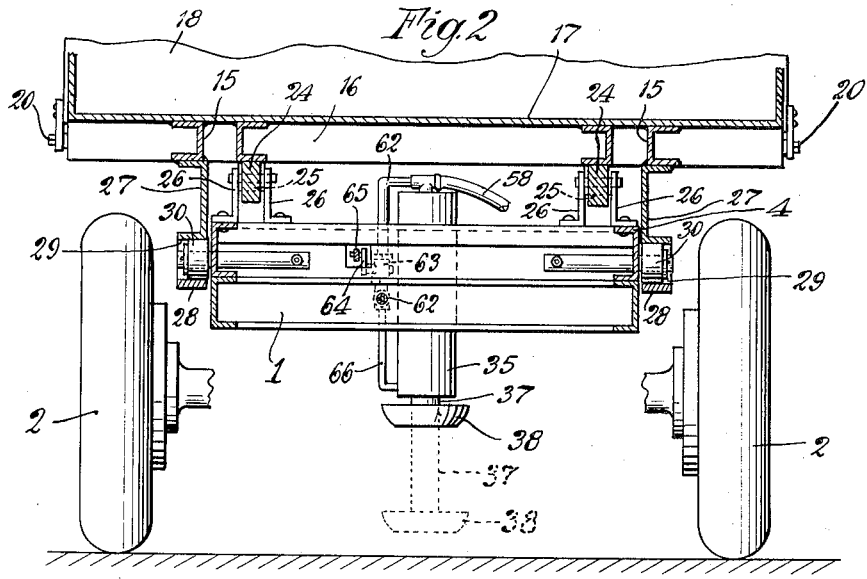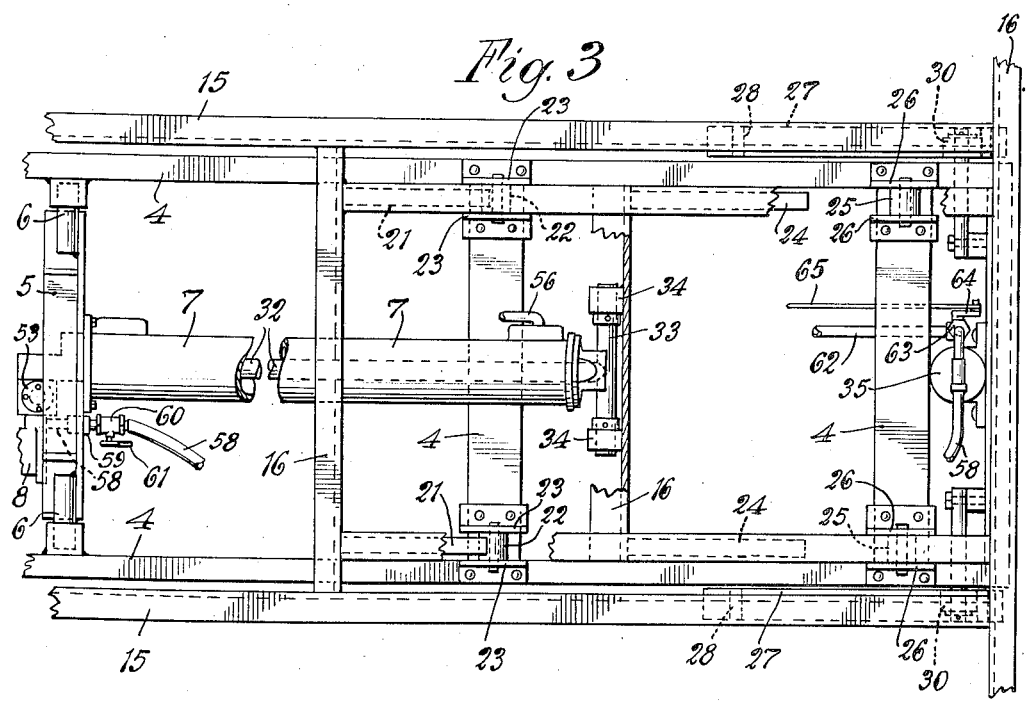

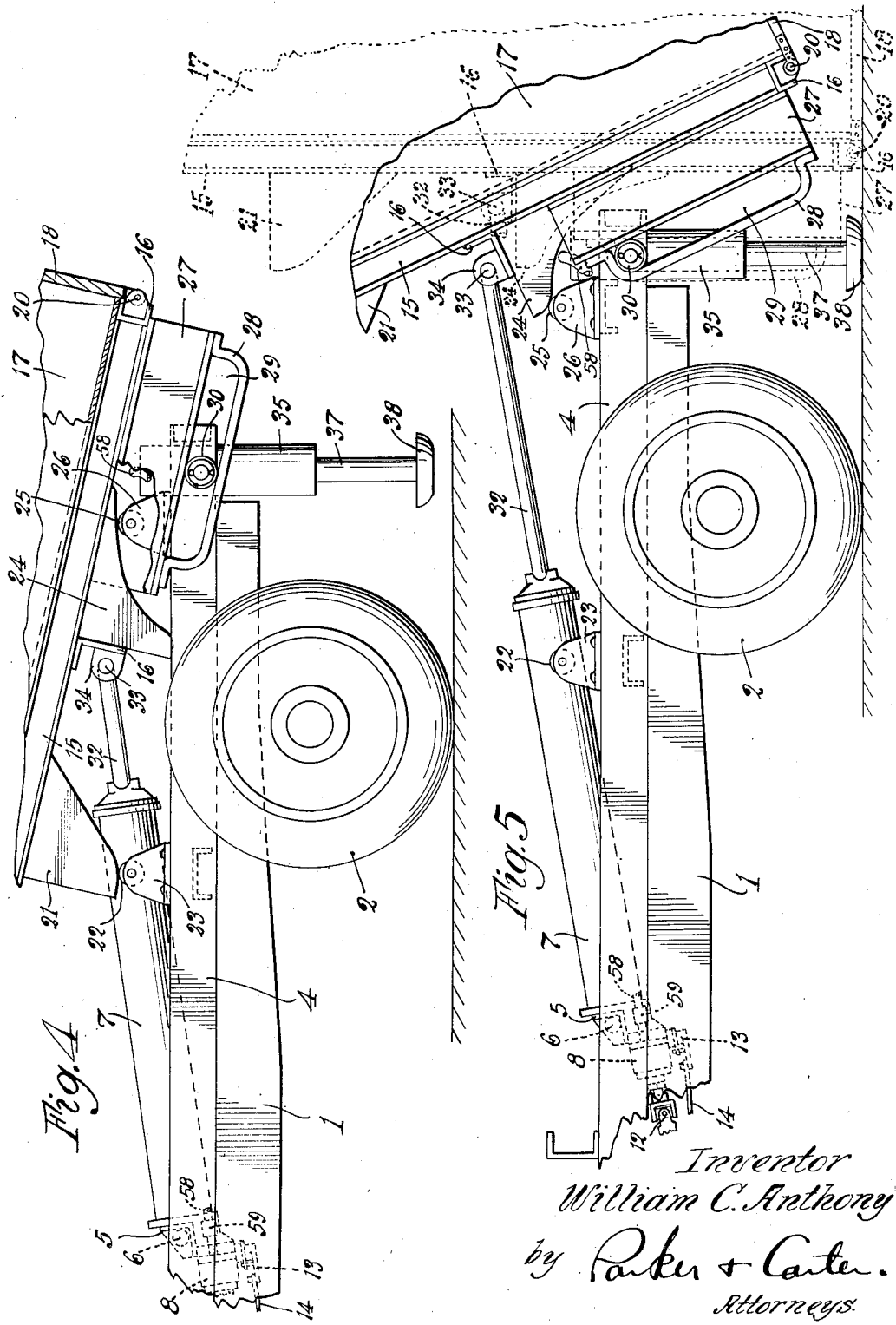

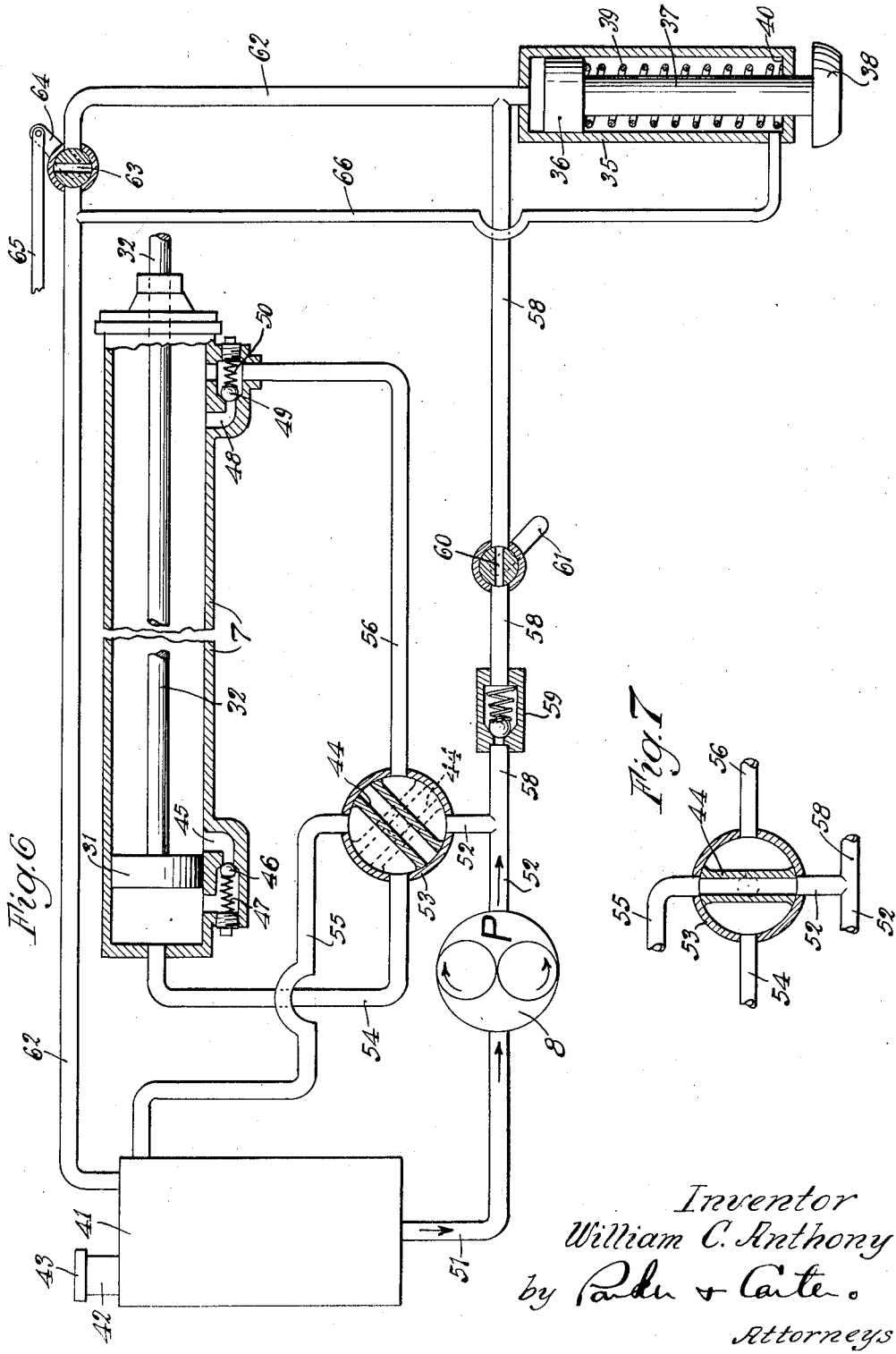

Patented Feb. 6, 1940

2,189,052

UNITED STATES PATENT OFFICE 2,189,052

PICKUP AND DUMPING VEHICLE

William C. Anthony, Streator, Ill., assignor to Anthony Company, Inc., Streator, Ill., a corporation of Illinois Application November 30, 1938, Serial No. 243,073

16 Claims. (Cl. 214—65)

This invention relates to a dumping or tipping receptacle and to means for dumping it and to means for supporting it during dumping. It has one object providing mechanism in connection with a dumping body adapted automatically to come into operation at the time of dumping and to provide a support for the receptacle which becomes effective either before tipping movement has occurred or early during the period of tipping.

Other objects will appear from time to time throughout the specification and the claims.

The invention is illustrated more or less diagrammatically in the accompanying drawings, wherein:

Figure 1 is a side elevation of one form of the device with parts broken away;

Figure 2 is a transverse vertical section taken at line 2—2 of Figure 1 with parts omitted;

Figure 3 is a horizontal plan view taken at line 3—3 of Figure 1 with parts omitted and parts broken away;

Figure 4 is a side elevation with parts omitted, illustrating the position of the apparatus when a tip has commenced—as shown the body has been tipped to approximately 13 degrees from its horizontal position;

Figure 5 is a view similar to Figure 4, showing the apparatus after it has moved to a 65 degree tipped position;

Figure 6 is a schematic arrangement of the hydraulic mechanism for operating the device;

Figure 7 is a detailed schematic section showing a changed position of the control valve.

Like parts are designated by like characters throughout the specification and the drawings.

While the invention might be applied to a stationary receptacle or to movable receptacles of many different sorts, in the particular form here shown it is mounted upon an automobile truck; and it will be described in connection with that showing. The truck comprises a chassis frame 1, having wheels 2 carried by any suitable means; it may have a cab 3. The tipping receptacle and its operating means may conveniently be arranged within a sub-frame 4, which includes suitable longitudinal and transverse members, and is secured to the chassis frame by bolting or in any other desired manner. Pivotally supported upon a pivoted member 5, which is itself trunnioned in the sub-frame 4 by trunnions 6, is a hydraulic cylinder 7. Fluid under pressure may be supplied to the cylinder from any desired source. As a matter of convenience, a pump 8 is in the particular form here shown mounted upon the cylinder head so that it moves as a unit with it. Any other pump arrangement might be used if desired. The invention is not limited to this particular form. In the particular form here shown, the pump is driven from a shaft 9, which may itself be actuated by the motor of the vehicle, or otherwise. The shaft is connected to the pump shaft 10 by means of a telescopic joint 11 and a universal joint 12. As shown in Figure 1, a valve handle or lever 13 projects from the housing of the pump 8, and by means of a member 14 the valve lever is connected to a handle or other suitable means for operating it. This is preferably located in the driver's cab or adjacent the seat of the vehicle.

A body or receptacle frame 15 is formed of suitable side members and suitable cross members 16. Secured to the frame 15 may be a receptacle 17, which may, if desired, have a tail gate 18. In the particular form here shown, the tail gate is arranged to be hinged either at the top, as at 19, or at the bottom, as at 20; whichever hinge arrangement is desired will be used and the other discarded so that the gate may swing either from the top or the bottom.

The body receptacle 17 is carried from the sub-frame by means of pairs of cams. As shown particularly in Figures 1, 4 and 5, the body is provided on each side with cams 21, which in certain positions of adjustment rest upon rollers 22 carried between saddles 23, which are secured to the side frame members of the sub-frame 4. Correspondingly, there is provided a second pair of cams 24, which in certain positions of adjustment contact rollers 25, which are mounted between saddles 26, which are themselves secured to the side frame members of the sub-frame 4.

Depending downwardly from the frame members 15 and adjacent their rear ends are positioned extension members 27, which may be of channel form as shown and which carry at their lower edges retaining members 28. These members 28, together with the lower edges of the members 27, define slots or channels 29 within each of which are located rollers 30, which are journaled toward the rear ends of the sub-frame members 4.

Positioned for reciprocation within the cylinder 7 is a piston 31 to which a piston rod 32, which extends out of the cylinder 7, is secured. At its outer end the piston rod 32 is secured to a cross-head 33, which is supported in bearings 34 on one of the cross members 16 of the dumping frame.

Secured adjacent the rear end of the assembly and in the particular form here shown mounted upon the sub-frame 4 is a jack-cylinder 35. A piston 36 is mounted within the jack-cylinder provided with a rod or outwardly extending member 37, which terminates in a foot 38. A spring 39 is positioned within the cylinder 35 and about the member 37 and bears against the flange 40 at one end, and at the other end bears against the piston 36. The spring is adapted, when free to do so, to raise the foot and piston and to retain them in the raised position.

The hydraulic system for purposes of simplicity is illustrated primarily in the schematic diagram of Figure 6. As there shown, certain of the parts are separated. As a matter of fact, they will ordinarily be made or positioned together. Thus the pump, the control valve and the sump are preferably all mounted together with the cylinder to move as a unit. With this understanding, the description below is to be taken as diagrammatic.

A sump 41 with an opening 42 having a closure 43 is provided for association with the cylinder 7, the pump 8 and the main control valve 44. In the particular form here shown, the main hydraulic cylinder 7 is arranged for double action so that it may be driven in either direction. The cylinder 7 is provided with a by-pass 45, within which a ball check valve 46 and a spring 47 are positioned. The cylinder is provided with a second by-pass connection 48 oppositely disposed with respect to the by-pass 45 and containing a second ball check valve 49 and spring 50. A fluid conduit 51 leads to the sump from the pump 8. From the pump 8, a fluid conduit 52 leads to the valve housing 53, within which the main control valve 44 is positioned. From the housing 53 a conduit 54 leads to one end of the cylinder 7. Also from the housing 53 a conduit 55 leads back to the sump 41. A third conduit 56 leads from the valve housing 53 to the opposite end of the cylinder 7.

A branch conduit 58 leads from the conduit 52 through a ball check assembly 59 and a valve 60, having an operating handle 61, to the jack-cylinder 35. Communicating with the conduit 58 is a branch 62, which is controlled by a valve 63 and leads back to the sump 41. The valve 63 has an operating lever 64, from which an operating member 65 leads forward to the operator's cab or to any other convenient place of use. A bleeder conduit 66 leads from the cylinder 35 back to the return pipe or conduit 62. The purpose of this member is to furnish a return path for fluid which may leak past the piston 36 and which would otherwise be entrapped within the cylinder below the piston and would thus prevent satisfactory jack operation.

Although I have shown an operative form of my device, it will be understood that many changes in the form, shape and arrangement of parts might be made without departing from the spirit of my invention, and I wish that my showing be taken as in a sense diagrammatic.

In particular, the hoisting mechanism might be almost infinitely varied. The arrangement of a double-acting piston and cylinder system might be altered to a single-acting system. The jack might be omitted, or it might be used with a very different body mechanism.

The use and operation of this invention are as follows:

As shown, one purpose of the invention is to provide a jack or auxiliary supporting mechanism associated with a body in such manner that it supports the load under certain conditions at a point in rear of the main support and in the rear of the rearmost support.

Experience has shown that in tipping receptacles where the receptacle is very heavy or is positioned to the rear of or well back with respect to the location of the support, sometimes the body or the vehicle tends to over-run or over-tip. In a dumping body, in particular, the body at the time of tipping swings to the rear; or if the body does not swing to the rear, the load moves to the rear with respect to its point of support as the body is tipped. To counteract this effect, counter weights and other devices have been used; and since this involves carrying dead weight, it is wasteful. The present invention provides means for compensating for the rearward positioning or rearward movement of the load. Preferably, this means is associated with the tipping means so that actuation of the tipping means also actuates the jack; and they are preferably arranged so that the jack is actuated positively before the tipping commences or else before substantial tipping movement has occurred.

One mechanism for accomplishing this result is shown in Figure 6. As there shown, the hydraulic system comprises a pump, a piston and a double-acting cylinder, a valve controlling the direction of flow of the fluid and a sump or fluid-storage member. In practice, it will be convenient to have the pump and the valve and the sump all arranged to be mounted upon the piston, and a part of the cylinder may be adapted for fluid storage to avoid the necessity of a separate sump if desired. The valve 44, which controls the direction of fluid flow, may be manipulated from the driver's seat or elsewhere.

When it is desired to tip the body—either to dump or to pick up a load—the valve 44 is moved into the dotted line position of Figure 6. Fluid then flows from the pump through the conduit 52, past the valve 44, through the conduit 54 into the left-hand end of the cylinder 7, and forces the piston 31 outward to tip the body. At the same time that this occurs, however, pressure fluid passes through the check valve 59, the conduit 58, the control valve 60 and into the cylinder 35. The spring 39 is of such tension that its resistance to depression of the piston 36 is not great and, ordinarily its resistance is so small that the moment fluid flows to the cylinder 35, the piston will be depressed and the jack will be forced downwardly. This will ordinarily occur before sufficient pressure has been built up in the cylinder 7 to effect any piston movement in the latter. Thus, the jack is down, as shown in Figure 4, when the body tipping has not become sufficient to cause any danger of over-tipping or over-balancing.

As pressure builds up in the cylinder 7 and tipping goes on, the weight of the load being increasingly concentrated rearwardly may depress the body or the springs which carry the body and the jack 38 thus comes into contact with the ground—this condition is shown in Figure 5—and, thus, the position of support and contact with the ground is shifted rearwardly from the wheel 2 to the jack 38. The tipping may continue until the dotted line position of Figure 5 is reached, in which the body rests upon the ground. In this position, its load may be discharged bodily and as a unit; or, if it is to be used to pick up a load, the truck will have been positioned so that the body, when tipping to the dotted line position of Figure 5, overlies the load that is to be picked up. If the empty body is tipped to that position, it may happen that the weight of the body alone is not sufficient to bring the jack-foot and the body fully in contact with the ground; and if that is the case, the truck, with the body tipped to the full position, may be moved rearwardly over the load that is to be picked up.

After the body has moved to the full tipped position, when it is to be returned, the valve 44 is moved to the full line position of Figure 6 and pressure passes from the pump through the conduit 52, past the valve 44, through the conduit 56 to the right-hand end of the cylinder 7; and as pressure builds up, it moves the piston to the position of Figure 6 and returns the body to the untipped position. The valve 63 will be manipulated by the lever 64 and the member 65 to open the conduit 62 and, thus, fluid from within the cylinder 35 passes out of the cylinder and returns through the conduit 62 to the sump. The spring 39 is effective to raise the piston. Thus, a power return is provided in addition to the power tip, and unless valves 60 or 63 or both of them are manipulated to prevent it, the jack will always be down when there is pressure in the system to cause movement of the piston 31. Obviously, if the valve 60 is moved to the closed position, no fluid will be forced under pressure to the cylinder 35. The bleeder conduit 66 is provided to permit return to the system of any fluid which may get past the piston 36.

When it is desired to permit the pump to run without directing fluid under pressure to the cylinder 7, the valve 44 is moved to the position of Figure 7.

In the particular form of body-mounting here shown, the body is arranged to move bodily to the rear, the cam supports 21 and 24 riding upon the rollers 22 and 25, respectively. In the initial movement of the body rearwardly from the position of Figure 1, the body is supported upon the cams 21 and upon the rollers 30. After a certain amount of movement, sufficient tilting occurs to lift the cams 21 out of contact with the rollers 22. At about this time, the cams 24 come into contact with the rollers 25. Toward the end of the tip, as shown in full lines of Figure 5, the cams 24 move out of contact with the rollers 25; and thereafter, for the remainder of the tip, the body is supported by the rollers 30 alone and their contact with members 28 and the flanges of the members 27.

I claim:

1. In combination in a tipping assembly, a load-carrying member, a support for it, a ground-contacting member joined to said support, means for tipping the load-carrying member with respect to its support, and a ground contacting jack positioned on said support, and means for forcing the jack downward to contact the ground at a point rearwardly from said ground-contacting member in the direction of tip, said means connected with the tipping means.

2. In combination in a tipping assembly, a load-carrying member, a support for it, a ground-contacting member joined to said support, means for tipping the load-carrying member with respect to its support, and a ground contacting jack positioned on said support, and means for forcing the jack downward to contact the ground at a point rearwardly from said ground-contacting member in the direction of tip, said means connected with the tipping means and so arranged that the jack is positively forced downwardly thereby before substantial tipping has occurred.

3. In combination in a tipping assembly, a load-carrying member, a support for it, a ground-contacting member joined to said support, moving means for the load-carrying member for moving it bodily with respect to its support, and a ground contacting jack positioned on said support, and means for forcing the jack downward to contact the ground at a point rearwardly from said ground-contacting member in the direction of tip, said means connected with the tipping means.

4. In combination in a tipping assembly, a load-carrying member, a support for it, a ground-contacting member joined to said support, moving means for the load-carrying member for moving it bodily with respect to its support, and a ground contacting jack positioned on said support, and means for forcing the jack downward to contact the ground at a point rearwardly from said ground-contacting member in the direction of tip, said means connected with the tipping means and so arranged that the jack is forced downwardly before substantial tipping has occurred.

5. In combination in a tipping assembly, a load-carrying member, a support for it, a ground-contacting member joined to said support, means for tipping the load-carrying member with respect to its support and for moving it bodily with respect to its support, and a ground contacting jack positioned on said support, and means for forcing the jack downward to contact the ground at a point rearwardly from said ground-contacting member in the direction of tip, said means connected with the tipping means.

6. In combination in a tipping assembly, a load-carrying member, a support for it, a ground-contacting member joined to said support, means for tipping the load-carrying member with respect to its support and for moving it bodily with respect to its support, and a ground contacting jack positioned on said support, and means for forcing the jack downward to contact the ground at a point rearwardly from said ground-contacting member in the direction of tip, said means associated with the tipping means and so arranged that the jack is forced downwardly before substantial tipping has occurred.

7. In combination in a load-carrying and dumping apparatus, a vehicle, a load-carrying means mounted thereon, means for tipping said load carrier with respect to said vehicle, wheels of said vehicle furnishing a point of support on the ground, and a ground contacting jack, means for moving said jack, said tipping means and said jack-moving means connected together to cause movement of said jack downward before substantial tipping movement occurs.

8. In combination in a load-carrying and dumping apparatus, a vehicle, a load-carrying means mounted thereon, means for tipping said load carrier with respect to said vehicle, wheels on said vehicle furnishing a point of support on the ground, and a ground contacting jack, means for moving said jack, said tipping means and said jack-moving means connected together to cause movement of said jack downward before substantial tipping movement occurs, said tipping and jack-moving means being hydraulic and including a single source of hydraulic pressure fluid and a plurality of controls.

9. In combination in a load-carrying and dumping apparatus, a vehicle, a load-carrying means mounted thereon, means for tipping said load carrier with respect to said vehicle, wheels on said vehicle furnishing a point of support on the ground, and a ground contacting jack positioned rearwardly of said wheels, means for moving said jack, said tipping means and said jack-moving means connected together to cause movement of said jack downward before substantial tipping movement occurs.

10. In combination in a load-carrying and dumping apparatus, a vehicle, a load-carrying means mounted thereon for movement with respect thereto, means for tipping said load carrier with respect to said vehicle, wheels on said vehicle furnishing a point of support on the ground, means for moving said load carrier bodily with respect to said vehicle, and a ground contacting jack, means for moving said jack, said tipping means and said jack-moving means connected together to cause movement of said jack downward before substantial tipping movement occurs.

11. In combination in a load-carrying and dumping apparatus, a vehicle, a load-carrying means mounted thereon for movement with respect thereto, means for tipping said load carrier with respect to said vehicle, wheels on said vehicle furnishing a point of support on the ground, means for moving said load carrier bodily with respect to said vehicle, and a ground contacting jack positioned rearwardly of said wheels, means for moving said jack, said tipping means and said jack-moving means connected together to cause movement of said jack downward before substantial tipping movement occurs.

12. In combination in a load-carrying and dumping apparatus, a vehicle, a load-carrying means mounted thereon for movement with respect thereto, means for tipping said load carrier with respect to said vehicle, wheels on said vehicle furnishing a point of support on the ground, means for moving said load carrier bodily with respect to said vehicle, and a jack positioned rearwardly of said wheels, means for moving said jack, said tipping means and said jack-moving means connected together to cause movement of said jack downward before substantial tipping movement occurs, said tipping and jack-moving means being hydraulic and including a single source of hydraulic pressure fluid and a plurality of controls.

13. In combination in a tipping assembly, a load-carrying member, a support for it, moving means for the load-carrying member for moving it bodily with respect to its support, said means including a hydraulic assembly carried from said support and connected to said load-carrying member, there being a plurality of cams on said load-carrying member and a bearing for each of said cams mounted upon said support.

14. In combination in a tipping assembly, a load-carrying member, a support for it, means for tipping the load-carrying member with respect to its support and for moving it bodily with respect to its support, said means including a hydraulic assembly carried from said support and connected to said load-carrying member, there being a plurality of cams on said load-carrying member and a bearing for each of said cams mounted upon said support.

15. In combination in a tipping assembly, a load-carrying member, a support for it, moving means for the load-carrying member for moving it bodily with respect to its support, said means including a hydraulic assembly carried from said support and connected to said load-carrying member, there being a plurality of cams on said load-carrying member and a bearing for each of said cams mounted upon said support, and rollers positioned upon said supports, and track-forming members positioned on said load-carrying member, the rollers being an engagement with the track-forming members.

16. In combination in a tipping assembly, a load-carrying member, a support for it, means for tipping the load-carrying member with respect to its support and for moving it bodily with respect to its support, said means including a hydraulic assembly carried from said support and connected to said load-carrying member, there being a plurality of cams on said load-carrying member and a bearing for each of said cams mounted upon said support, and rollers positioned upon said supports, and track-forming members positioned on said load-carrying member, the rollers being an engagement with the track-forming members.

WILLIAM C. ANTHONY.